May 9, 1967  P. W. WEISER  3,318,594
GRIPPING DEVICE
Filed Jan. 8, 1964

Inventor:
Perry W. Weiser,
by Harold J. Holt
His Attorney.

United States Patent Office 3,318,594
Patented May 9, 1967

3,318,594
GRIPPING DEVICE
Perry W. Weiser, Rochester, Mich., assignor to General Electric Company, a corporation of New York
Filed Jan. 8, 1964, Ser. No. 336,496
3 Claims. (Cl. 269—265)

This invention relates to a gripping device.

It is widely known that an irregular surface possesses greater frictional gripping ability than a smooth surface. Thus, the gripping surfaces of devices for releasably holding a part against movement relative to the surface have assumed a variety of irregular contours. Typically, such surfaces take the form of serrations in which the teeth are in the form of an inverted V of various degrees of sharpness.

Such gripping surfaces possess a number of drawbacks. If the teeth are sharp, they easily become dull and ineffective in use. If the surface is hardened, the teeth become subject to structural weakness, are fragile and easily broken off. Moreover, the gripping surfaces are seldom effective at temperatures over 350° F. after they have been subjected to a metallurgical hardening process. The sharpness of the teeth may be reduced by grinding or removing the sharp edges but only by compromising gripping ability.

Theoretically, it should be possible to produce irregular surfaces having a large number of other contours by usual metallurgical shaping processes such as casting, forging, grinding or machining. However, as a practical matter, the variety of such contours is severely limited. A gripping surface should be harder than the part it is gripping. In industrial applications, such as the gripping surfaces of cutting and machining tools and parts and of feed mechanisms, this ordinarily translates into a hardness of at least 60 Rockwell C. With metals of this hardness, there are severe practical and cost limitations on the shaping and forming processes which may be used. This accounts for the widespread use, in spite of the inherent drawbacks, of serrated gripping surfaces or surfaces generally having a multitude of angled teeth of various degrees of sharpness.

The principal object of the present invention is to provide a gripping element having an unusually high degree of gripping ability, which retains its effectiveness over long periods and at high temperatures, causes a minimum of damage to the part being held, and which may be produced economically.

The foregoing and other objects of this invention are achieved in a gripping element which comprises a plurality of closely spaced or contacting spheres fixedly mounted on a supporting surface. In its preferred form, the invention comprises a plurality of metallic spheres having a hardness in excess of 60 Rockwell C and having a diameter of less than about 0.25 inch. A still more preferred embodiment of the invention comprises cemented carbide spheres or balls having a size ranging from 0.008 to 0.1 inch in diameter. Such cemented carbide balls are commercially available at very low cost, having diameter tolerances of ±0.001 inch and possess a high degree of sphericity or roundness in their unground condition. Their refractory properties make them useful at temperatures as high as about 750° F. It has been found that a gripping device of unusual gripping ability and having high hardness and thus resistance to heavy load may be economically produced from such cemented carbide balls.

The unique properties of the device of the invention are to a large extent derived from the unusual properties of a sphere. A sphere is the strongest of any geometric shape and is accordingly extremely high in shear strength and highly resistant to shock and impact forces. Moreover, a sphere responds readily to uniform structural and physical properties through heat treatment. In addition, the rounded contour presented by the spherical elements has a minimum tendency to deform the part being held because contact is distributed over a relatively wide area. And, perhaps most significantly, a multitude of such spheres fixedly mounted on a support have been found to provide a tenacious gripping surface.

The invention will be better understood from the following description taken in connection with the accompanying drawing in which.

Figure 1:
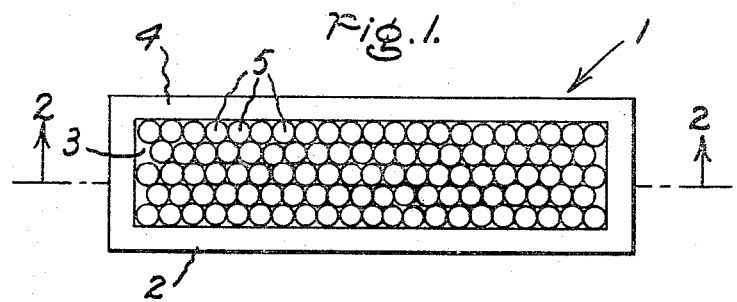
FIG. 1 is a plan view of a gripping element formed in accordance with one embodiment of this invention.
Figure 2:
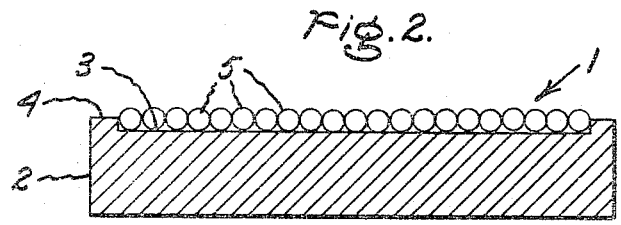
FIG. 2 is a sectional elevational view taken along lines 2—2 of FIG. 1.

In order to distribute the force applied to the gripping device over a relatively large area on the object to be held, it is desirable to use a large number of spherical gripping elements. This is illustrated in FIGS. 1 and 2, in which gripping device 1 comprises a base member 2 having a recess 3 formed in the working face 4 thereof. Located within the recess 3 are a multitude of spherical elements or balls 5 which form the gripping surface of the gripping device 1. While for clarity, the spheres shown in the drawing are relatively large, they are desirably sufficiently small and closely spaced to provide a surface density in excess of sixteen, and even more desirably, two hundred spheres per square inch. The spherical gripping elements 5 are fixedly attached to the base member 2 in such manner as to prevent relative motion, either translational or rotational, between the gripping elements 5 and the base member 2. This may be accomplished by any of the commonly used adhering methods such as welding, brazing or cementing or, alternatively, they may be attached by mechanical means.

Figure 3:
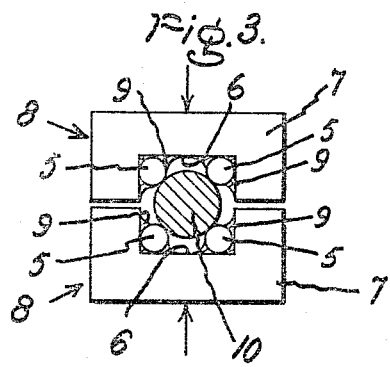
FIG. 3 is a sectional elevational view of a second embodiment of the invention.

FIG. 3 shows a second embodiment of the invention in which the carbide spheres 5 are arranged along the corners of recess 6 in support 7 of gripping element 8. Spheres 5 are brazed into recess 6 by brazing alloy 9. When suitable force is applied in the direction of the arrows, the two facing gripping elements 8 will securely hold shaft 10 against movement.

The size and hardness of the spheres may be varied depending upon the particular application for which the gripping device is used. The spheres should generally be harder than the object being held and are preferably in excess of 60 Rockwell C. The smaller the sphere diameter and the greater the number of spheres per surface square inch, the more effective is the gripping power and the less is the damage to the object held. The mutual effect of sphere diameter and hardness determines the gripping power and damage propensity of the gripping device. It is preferable for most industrial tooling applications to use spheres of less than about 0.25 inch diameter and, in its preferred form, of about 0.008 to 0.1 inch diameter.

While the particular material used for forming the spheres may vary with the application, it has been found that cemented tungsten carbide balls offer many advantages. Unground carbide balls are commercially available in sizes ranging from .008 inch to .010 inch in diameter at very low cost. Furthermore, cemented carbide is second only to diamond in hardness and abrasion resistance and, thus, gripping devices employing the cemented carbide gripping spheres of the invention have a useful working life far in excess of gripping devices commercially available today. A third advantage of cemented carbide balls is that these balls inherently have a surface texture which produces a high coefficient of friction or high gripping factor. Additionally, gripping devices utilizing carbide gripping surfaces can handle objects or workpieces having a temperature up to 750° without being damaged. Some applications may require the spheres to have additional backup support. These may take the form of additional layers of spheres or preferably a hardened support member between the spheres and the base member. The hardened support member may be in the form of a carbide subplate whose hardness is intermediate that of the carbide spheres and the base member.

For most applications, the spheres will be of generally uniform size so as to present a uniform gripping surface. However, if the object to be held is irregular in contour, the gripping surface may conform to such contour either through use of an irregular-shaped support member or of spheres of differing size, or both.

The gripping elements of the invention may obviously be used in a vast variety of gripping devices which themselves are well known. A gripping device formed with the gripping elements of this invention will efficiently grip an object with minimum damage to the object through a higher temperature range than is permitted by the prior art gripping devices. In addition, the gripping device has a life far in excess of any gripping device available today due to the inherent characteristics of spherical members to withstand greater forces.

What I claim as new and desire to secure by Letters Patent of the United States is:

1. A gripping element comprising a plurality of cemented carbide spheres fixedly mounted in contact with each other on a supporting base so as to prevent relative motion between said spheres and said base, the portion of said spheres facing away from said supporting base forming the exposed surface of said gripping element, said spheres being sufficiently closely spaced so as to present a substantially continuously gripping surface over at least a portion of said element, said gripping element adapted for use in a gripping device to releasably but securely hold a part against movement by frictional contact between the part and the exposed surface of the gripping element.

2. The gripping element of claim 1 in which the diameter of said spheres is no greater than 0.25 inch.

3. The gripping element of claim 1 in which the density of said spheres is at least 16 spheres per square inch.

References Cited by the Examiner
UNITED STATES PATENTS

| | | | |
|---|---|---|---|
| 609,343 | 8/1898 | Harvey | 81—186 |
| 1,960,042 | 5/1934 | Andrus | 29—454 |
| 2,387,038 | 10/1945 | Owens | 88—82 |
| 2,568,126 | 9/1951 | Keeley | 88—82 |
| 2,615,682 | 10/1952 | Stone | 269—285 |
| 3,089,233 | 5/1963 | Meier | 24—23 |
| 3,090,614 | 5/1963 | Freeman | 269—273 |
| 3,241,777 | 3/1966 | Kuntz | 241—300 |

HAROLD D. WHITEHEAD, *Primary Examiner.*